US006134230A

United States Patent [19]
Olofsson et al.

[11] Patent Number: 6,134,230
[45] Date of Patent: Oct. 17, 2000

[54] METHOD FOR SELECTING A LINK PROTOCOL FOR A TRANSPARENT DATA SERVICE IN A DIGITAL COMMUNICATIONS SYSTEM

[75] Inventors: Håkan Gunnar Olofsson, Stockholm; Carl Magnus Frodigh, Kista; Johan Christer Johansson, Solna, all of Sweden

[73] Assignee: Telefonaktiebolaget LM Ericsson, Stockholm, Sweden

[21] Appl. No.: 08/921,322

[22] Filed: Aug. 29, 1997

[51] Int. Cl.[7] .................................................. H04B 7/212
[52] U.S. Cl. ........................ 370/337; 370/347; 370/468
[58] Field of Search .................................. 370/343, 345, 370/347, 442, 465, 468, 328, 329, 336, 337, 479, 252; 455/67.1

[56] References Cited

U.S. PATENT DOCUMENTS

| | | | |
|---|---|---|---|
| 5,327,576 | 7/1994 | Uddenfeldt et al. | 370/468 |
| 5,590,405 | 12/1996 | Daly et al. | 370/468 |
| 5,701,294 | 12/1997 | Ward et al. | 370/252 |
| 5,822,315 | 10/1998 | De Seze et al. | 370/337 |
| 5,909,469 | 6/1999 | Frodigh et al. | 375/302 |

FOREIGN PATENT DOCUMENTS

| | | | |
|---|---|---|---|
| WO 95/28814 | 10/1995 | WIPO | H04Q 7/38 |
| WO 96/36146 | 11/1996 | WIPO | H04L 1/12 |
| WO 97/13388 | 4/1997 | WIPO | H04Q 1/12 |
| WO97/1388 | 4/1997 | WIPO . | |

OTHER PUBLICATIONS

J.E. Kleider et al., "An Adaptive–Rate Digital Communication System for Speech," IEEE International Conference on Acoustics, Speech, and Signal Processing, Speech Processing, Digital Signal Processing, Munich, vol. 3, Apr. 21–24 1997, pp. 1695–1698.

Sköld, Johan et al., "Cellular Evolution Into Wideband Services", VTC 1995, Jul. 3, 1997.

*Primary Examiner*—Ricky Ngo
*Attorney, Agent, or Firm*—Burns, Doane, Swecker & Mathis, L.L.P.

[57] ABSTRACT

In a communication system, a link protocol for a transparent data between a mobile station and a base station is selected by pre-selecting from all possible combinations of available link protocols a set of pre-selected combinations of link protocols based on a predefined service requirement and at least one basic capability of the mobile or base stations. Then, the link protocol is selected from the pre-selected combinations of link protocols based on measurements of one or more link quality parameters and at least one variable restriction caused by instantaneous conditions in the communication system.

22 Claims, 6 Drawing Sheets

METHOD FOR SELECTING A LINK PROTOCOL FOR A TRANSPARENT DATA SERVICE IN A DIGITAL COMMUNICATIONS SYSTEM

BACKGROUND

This invention generally relates to the field of communication systems and, more particularly, to digital communication systems that supports multiple modulation and channel coding schemes.

In wireless digital communication systems, standardized air interfaces specify most of system parameters, including modulation scheme, channel coding scheme, burst format, communication protocol, symbol rate, etc. For example, European Telecommunication Standard Institute (ETSI) has specified a Global System for Mobile Communication (GSM) standard that uses time division multiple access (TDMA) to communicate control, voice and data information over radio frequency (RF) physical channels or links using Gaussian Minimum Shift Keying (GMSK) modulation scheme at a symbol rate of 271 ksps. In the U.S., Telecommunication Industry Association (TIA) has published a number of Interim Standards, such as IS-54 and IS-136, that define various versions of digital advanced mobile phone service (D-AMPS), a TDMA system that uses a Differential QPSK (DQPSK) modulation scheme for communicating data over RF links.

Digital communication systems use a variety of linear and non-linear modulation schemes to communicate voice or data information in bursts. These modulation schemes include, GMSK, Quadrature Phase Shift Keying (QPSK), Quadrature Amplitude Modulation (QAM), etc. GMSK modulation scheme is a non-linear low level modulation (LLM) scheme with a symbol rate that supports a specified user bit rate. In order to increase user bit rate, high-level modulation (HLM) schemes can be used. Linear modulation schemes, such as QAM scheme, may have different level of modulation. For example, 16 QAM scheme is used to represent the sixteen variations of 4 bits of data. On the other hand, a QPSK modulation scheme is used to represent the four variations of 2 bits of data. In addition to various modulation schemes, digital communication systems can support various channel coding schemes, which are used to increase communication reliability.

Generally, channel coding schemes code and interleave data bits of a burst or a sequence of bursts to prevent their loss under degraded RF link conditions, for example, when RF links are exposed to fading. The number of coding bits used for channel coding of data bits corresponds to error detection accuracy, with higher number of coding bits providing higher bit error detection accuracy. For a given gross bit rate, a high number of coding bits, however, reduces user bit rate, since coding bits reduce the number of user data bits that can be transmitted in a burst.

The communication channel typically introduces errors in sequence. In order to improve coding efficiency, the coded bits are interleaved, before transmission. The purpose of interleaving is to distribute the errors over several code words. The term perfect interleaving is used when the sequence of the received data bits are uncorrelated. The less correlated the received data bits are at the receiver, the easier it is to recover lost data bits. On the other hand, if interleaving is not effective, large portions or blocks of transmitted data bits may be lost under degraded RF link conditions. Consequently, error correction algorithms may not be able to recover the lost data.

TDMA systems subdivide the available frequency band into one or several RF channels. The RF channels are divided into a number of physical channels corresponding to time slots in TDMA frames. Logical channels are formed from one or more physical channels, where modulation and channel coding schemes are specified. An RF link includes one or more physical channels that form the logical channels. In these systems, the mobile stations communicate with a plurality of scattered base stations by transmitting and receiving bursts of digital information over uplink and downlink RF channels.

The growing number of mobile stations in use today has generated the need for more voice and data channels within cellular telecommunication systems. As a result, base stations have become more closely spaced, with an increase in interference between mobile stations operating on the same frequency in neighboring or closely spaced cells. Although digital techniques gain more useful channels from a given frequency spectrum, there still remains a need to reduce interference, or more specifically to increase the ratio of the carrier signal strength to interference, (i.e., carrier-to-interference (C/I)) ratio. RF links that can handle lower C/I ratios are considered to be more robust than those that only can handle higher C/I ratios.

Depending on the modulation and channel coding schemes, grade of service deteriorates more rapidly as link quality decrease. In other words, the data throughput or grade of service of more robust RF links deteriorates less rapidly than those of less robust RF links. Higher level modulation schemes are more susceptible to link quality degradation than lower level modulation schemes. If a HLM scheme is used, the data throughput drops very rapidly with a drop in link quality. On the other hand, if a LLM scheme is used, data throughput and grade of service does not deteriorate as rapidly under the same interference conditions.

Therefore, link adaptation methods provide the ability to dynamically change a link protocol, which is defined by a combination of modulation scheme, channel coding, and/or the number of used time slots. The link protocol is selected based on channel conditions to balance the user bit rate against link quality. Generally, these methods dynamically adapt a system's link protocol to achieve optimum performance over a broad range of C/I conditions.

One evolutionary path for next generation of cellular systems is to use high-level modulation (HLM), e.g., 16 QAM modulation scheme, to provide increased user bit rates compared to the existing standards. These cellular systems include enhanced GSM systems with General Packet Radio Service (GPRS) extension, enhanced D-AMPS systems, International Mobile Telecommunication 2000 (IMT-2000), etc. A high level linear modulation, such as 16 QAM modulation scheme, has the potential to be more spectrum efficient than, for example, GMSK, which is a low-level modulation (LLM) scheme. Because higher level modulation schemes require a higher minimum C/I ratio for acceptable performance, their availability in the system becomes limited to certain coverage areas of the system or certain parts of the cells, where more robust RF links can be maintained.

In order to provide various communication services, a corresponding minimum user bit rate is required. In voice and/or data services, user bit rate corresponds to voice quality and/or data throughput, with a higher user bit rate producing better voice quality and/or higher data throughput. The total user bit rate is determined by a selected combination of techniques for speech coding, channel coding, modulation scheme, and for a TDMA system, the number of assignable time slots per call.

Data services include transparent services and non-transparent services. Transparent services, which have a minimum service quality requirement, provide constant user bit rates. A system that provides transparent communication services varies the gross bit rate to maintain a constant user bit rate with the required service quality. The service quality requirement of a transparent service between a mobile station and a base station is expressed in terms of a Quality of Service (QoS) vector that is defined by Equation (1):

$$QoS = \{R_{bu} = X \text{ kbits/s}, BER \text{ or } FER < Y\%\}, \quad (1)$$

where $R_{bu}$ is a constant user bit rate and BER and FER are a maximum Bit Error Rate (BER) or Frame Erasure Rate (FER), respectively, and X and Y are the required user bit rate and service quality (in percentage), respectively.

Conversely, in non-transparent services, for example, GPRS, GSM's extension for providing packet data, the user bit rate may vary, because erroneously received data bits are retransmitted. Unlike non-transparent services, transparent services do not retransmit erroneously received data bits. Therefore, transparent services have a constant point-to-point transmission delay, and non-transparent services have a non-constant point-to-point transmission delay.

A communication system may provide a data service through a number of RF links supporting different combinations of channel coding, speech coding, and/or modulation schemes. For example, the system may provide a multimedia service using two or more separate RF links that separately provide audio and video signals. Under this scenario, one of the two RF links may use HLM scheme and the other link may use LLM scheme. In order to provide a constant user bit rate in a TDMA system, LLM RF link may use a higher number of time slots than HLM link.

Accordingly, in order to provide transparent data service, digital communication systems must select a suitable link protocol based on link quality, to achieve a desired service quality for a given constant user bit rate. Since link quality, e.g., C/I ratio, varies rapidly in a system, different link protocols must be used to maintain the service quality. For example, for a high quality link, less channel coding may be used to increase user bit rate. In addition to fulfilling the user bit rate and service quality requirements, it is also important to optimize system's performance in terms of minimized overall interference and/or efficient allocation of communication resources, such as the number of assigned time slots, etc.

Therefore, there exist a need for a method of selecting a link protocol for providing a transparent service in a system that supports multiple modulation and channel coding schemes, while optimizing system performance.

SUMMARY

Briefly, the present invention is exemplified in a method for selecting a link protocol for a transparent data service having a predefined service requirement. The present invention pre-selects from all possible combinations of available link protocols a set of pre-selected combinations of link protocols. The set of pre-selected combinations is pre-selected based on a combination of modulation and channel coding schemes, and required number of time slots and based on the predefined service requirement. The predefined service requirement may for example be a requirement to provide a constant user bit rate with a predefined service quality, such as BER or a FER percentages. Moreover, the present invention takes into account at least one basic capability of the mobile or base stations in the pre-selection process. Preferably, a plurality of basic capability of the mobile or base stations may be taken into account. The basic capability may include communication capability of the mobile or base stations over a number of time slots.

Then, the present invention selects a link protocol from the set of pre-selected combinations of link protocols based on measurements of one or more link quality parameters, such as C/I ratio, BER, FER, or received signal strength. When selecting the link protocol, the present invention also takes into account at least one variable restriction caused by instantaneous conditions in the communication system. The variable restrictions caused by instantaneous conditions in the communication system may include system's instantaneous capacity to allocate time slots or instantaneous transmit power at the mobile or base stations. In the preferred embodiment of the invention, the present invention also optimizes the selected link protocol according to a pre-defined optimization criteria that may include a minimized transmit power at the mobile or base stations or a minimized number of used time slots.

Other features and advantages of the present invention will become apparent from the following description of the preferred embodiment, taken in conjunction with the accompanying drawings, which illustrate, by way of example, the principles of the invention.

DETAILED DESCRIPTION

Figure 1:
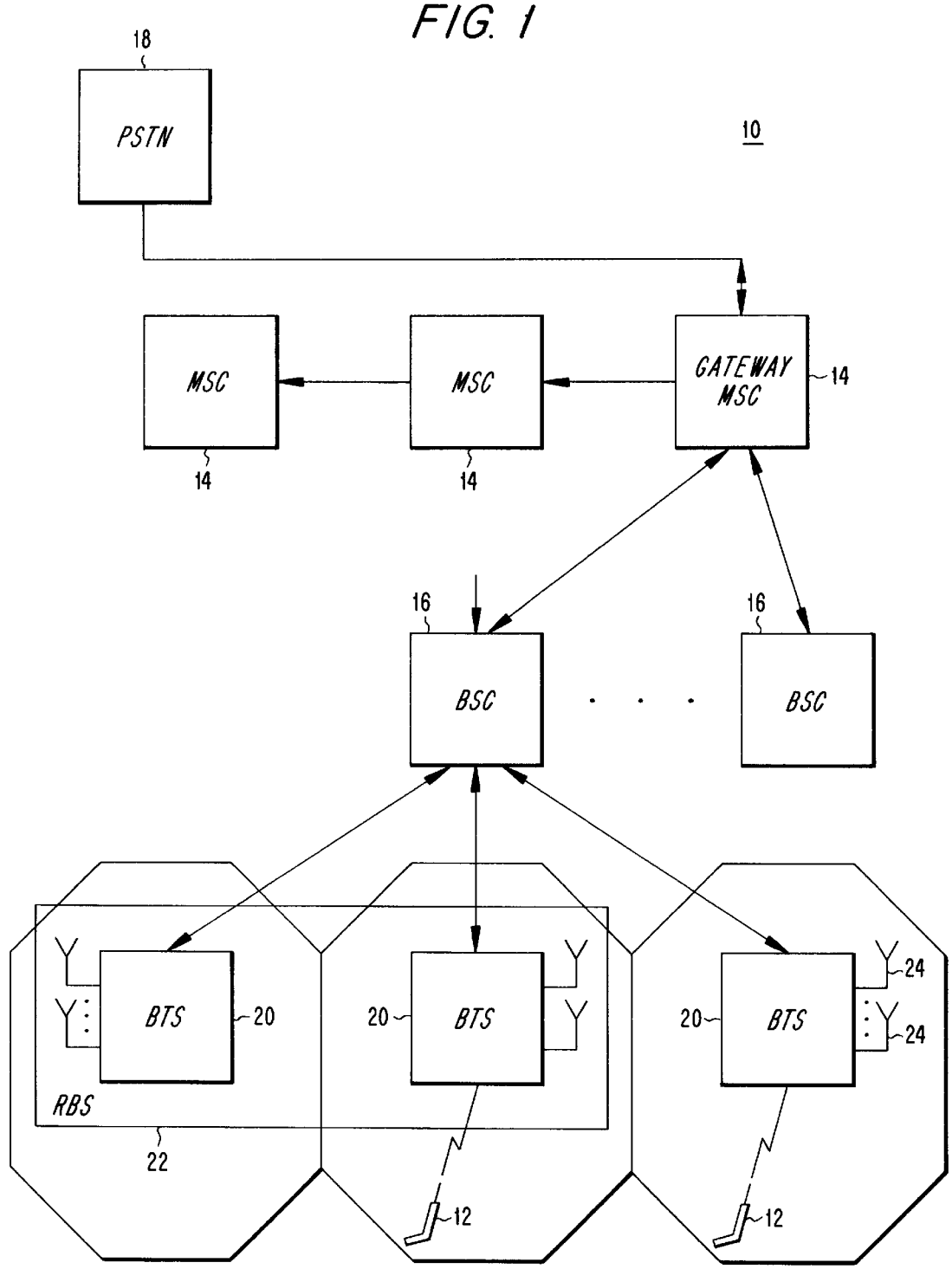
FIG. 1 is a block diagram of a communication system which advantageously uses the present invention.

Referring to FIG. 1, a communication system 10 according to an exemplary embodiment of the present invention supports multiple modulation schemes. In an exemplary embodiment of the invention, the system 10 supports three modulation schemes: a first LLM (LLM1) scheme, a second LLM (LLM2) scheme, and a HLM scheme. LLM1 scheme is a non-linear modulation scheme, such as GMSK modulation scheme used in GSM systems. LLM2 scheme is a linear modulation scheme, such as QPSK. Finally, HLM scheme is a higher level linear modulation schemes, for example, 16 QAM scheme, that could be supported by the second generation of enhanced GSM systems, which as of yet are not standardized.

The communication system 10 also supports different channel coding schemes (CS), such as CS1, CS2, CS3, and CS4 channel coding schemes, where CS1 has the lowest coding rate and CS4 has the highest coding rate. Although, the system 10 is described with reference to the above specified exemplary modulation and channel coding schemes, it should be noted that a wide range of modulation and coding schemes may be used to implement the present invention.

The mode of operation of GSM communication systems is described in European Telecommunication Standard Institute (ETSI) documents ETS 300 573, ETS 300 574 and ETS 300 578, which are hereby incorporated by reference. Therefore, the operation of the GSM system is described to the extent necessary for understanding of the present invention. Although, the present invention is described as embodied in a GSM system, those skilled in the art would appreciate that the present invention could be used in a wide variety of other digital communication systems, such as those based on PDC or D-AMPS standards and enhancements thereof. The present invention may also be used in CDMA or a hybrid of CDMA and TDMA communication systems.

The communication system 10 covers a geographical area that is subdivided into communication cells, which together provide communication coverage to a service area, for example, an entire city. Preferably, the communication cells are patterned according to a cell pattern that allows some of the spaced apart cells to use the same uplink and downlink RF channels. In this way, the cell pattern of the system 10 reduces the number of RF channels needed to cover the service area. The system 10 may also employ frequency hopping techniques, for example, to avoid "deadspots."

According to the present invention, the system 10 dynamically changes link protocol of an RF link based on fast changing link quality parameters in order to maintain a transparent service with a pre-defined service requirement. The pre-defined service requirement may be expressed in terms of a constant user bit rate with a minimum service quality, such as a BER percentage. The system 10 pre-selects from all possible combinations of channel coding scheme, modulation scheme, and communication resources, for example, required number of time slots (TS), a set of pre-selected combinations based on the service requirement of the transparent data service.

The pre-selection process also takes into account the basic capabilities of a number of mobile or base stations. Then, a link protocol is selected from the pre-selected combination based on measurements of one or more link quality parameters, for example, C/I ratio, and variable restrictions caused by instantaneous conditions on the capabilities of the mobile station and/or the base station. Such instantaneous conditions may, for example, include system capacity and transmit power limitations at any given time. Finally, the selection is optimized according to a pre-defined optimization criteria, such as a minimized transmit power at the mobile station 12 or a minimized number of used time slots.

The system 10 is designed as a hierarchical network with multiple levels for managing calls. Using an allocated set of uplink and downlink RF links, a number of mobile stations 12 operating within the system 10 participate in calls using allocated time slots. At a high hierarchical level, a group of Mobile Service Switching Centers (MSCs) 14 are responsible for the routing of calls from an originator to a destination. In particular, they are responsible for setup, control and termination of calls. One of the MSCs 14, known as the gateway MSC, handles communication with a Public Switched Telephone Network (PSTN) 18, or other public and private networks.

Different operators support different communication standards with different modulation and channel coding schemes. The same operator may also support different modulation and channel coding schemes in different cells. For example, one operator may support LLM1 modulation scheme and CS4 channel coding scheme only, whereas, another operator may support all of the modulation and channel coding schemes.

At a lower hierarchical level, each one of the MSCs 14 are connected to a group of base station controllers (BSCs) 16. The primary function of a BSC 16 is radio resource management. For example, based on reported received signal strength at the mobile stations 12, the BSC 16 determines whether to initiate a hand over. Under the GSM standard, the BSC 16 communicates with a MSC 14 under a standard interface known as the A-interface, which is based on the Mobile Application Part of CCITT Signaling System No. 7.

At a still lower hierarchical level each one of the BSCs 16 controls, a group of base transceiver stations (BTSs) 20. Each BTS 20 includes a number of TRXs that use the uplink and downlink RF channels to serve a particular common geographical area. The BTSs 20 primarily provide the RF links for the transmission and reception of data bursts to and from the mobile stations 12 within their designated cell. In an exemplary embodiment, a number of BTSs 20 are incorporated into a radio base station (RBS) 22. The RBS 22 may be configured according to a family of RBS-2000 products, which is offered by Ericsson.

Figure 2:
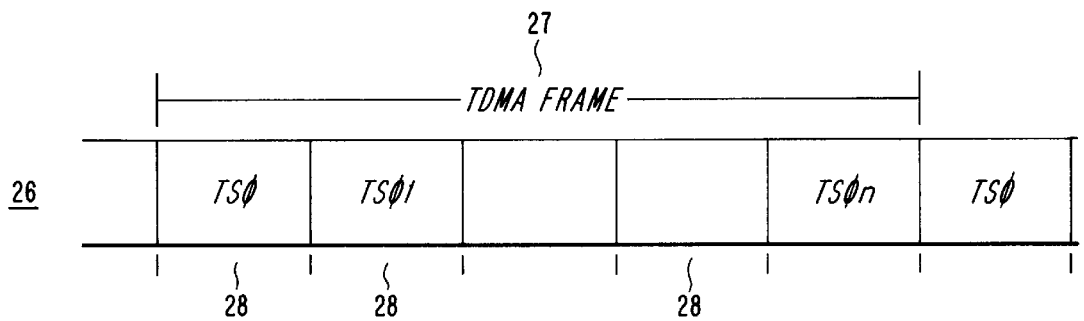
FIG. 2 is a diagram of a subdivided RF channel that is used in the communication system of FIG. 1.

With reference to FIG. 2, an RF channel 26 (uplink or downlink) is divided into repetitive time frames 27 during which information are communicated. Each frame 27 is further divided into time slots 28 that carry packets of information. Speech or data is transmitted during time slots designated as traffic channels ($TCH_1, \ldots, TCH_n$). All signaling functions pertaining to call management in the system, including initiations, hand overs, and termination are handled via control information transmitted over control channels.

The mobile stations 12 use slow associated control channels (SACCHs) to transmit associated control signals, such as an RX-LEV signal, which corresponds to the received signal strength at the mobile station 12 and RX-QUAL signal, which is a measure of various levels of bit error rate at the mobile station 12, as defined by the GSM standard. Fast associated control channels (FACCHs) perform control functions, such as hand-overs, by stealing time slots allocated for TCHs.

The BSC 16 instructs the RBS 22 based on measures of channel characteristics of RF links between mobile stations 12 to the RBS 22. As described later in detail, the channel characteristics may be measured based on a number of parameters, including received signal strength, bit error rate, the multipath propagation property of the uplink RF channel, for example, time dispersion, or a combination of them.

The system 10 carries out the transmission of information during a time slot in a burst that contain a predefined number of coded bits. The GSM specification defines various types of bursts: normal burst (NB), frequency correction burst (FB), synchronization burst (SB), access burst (AB), and dummy burst. The normal burst, which has a duration of 576 $\mu$s, is used both during the traffic and some control signalling channels. The remaining bursts are primarily used for access and maintaining signal and frequency synchronization within the system.

Figure 3:
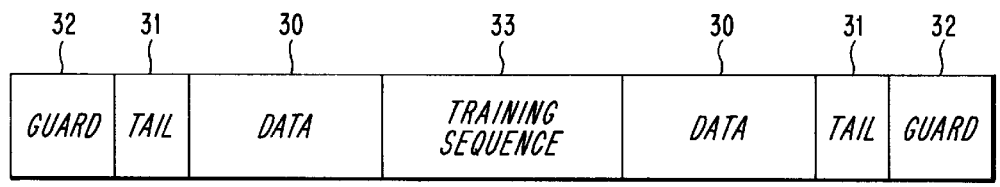
FIG. 3 is a diagram of a normal transmission burst transmitted on the RF channel of FIG. 2.

As shown in FIG. 3, a normal burst 29 includes two separate data portions 30 during which digital data bits are communicated. Among other things, the guard section 32 is used to allow for up-ramping of the burst and for downramping of the bursts. The tail section 31 is used for demodulation purposes. All burst transmissions, except dummy burst transmissions, include training sequences. The training sequences are patterned with predefined autocorrelation characteristics. During demodulation process, the auto correlation characteristic of the training sequence helps in the synchronization of the received bit sequences over a burst. In the normal burst 29, a training sequence 33 is positioned in the middle of the burst between its data portions.

In order to compensate for propagation delays over RF links, the communication system 10 uses a time alignment process by which the mobile stations 12 align their burst transmissions to arrive at the BTSs 20 in proper time relationship relative to other bursts transmissions. As described later, the mobile station 12 and the RBS 22 incorporate equalizers, which correlate received baseband bit sequences over the uplink or downlink RF channels with the training sequences, to provide correlator responses that correspond to the properties of multipath propagation. Based on the correlator responses, the receiver section of the BTS 20 generates a timing advance (TA) parameter. The mobile station 12 uses the TA parameter, which is transmitted from the RBS 22, for advancing or retarding its burst transmissions relative to a time reference.

Figure 4:
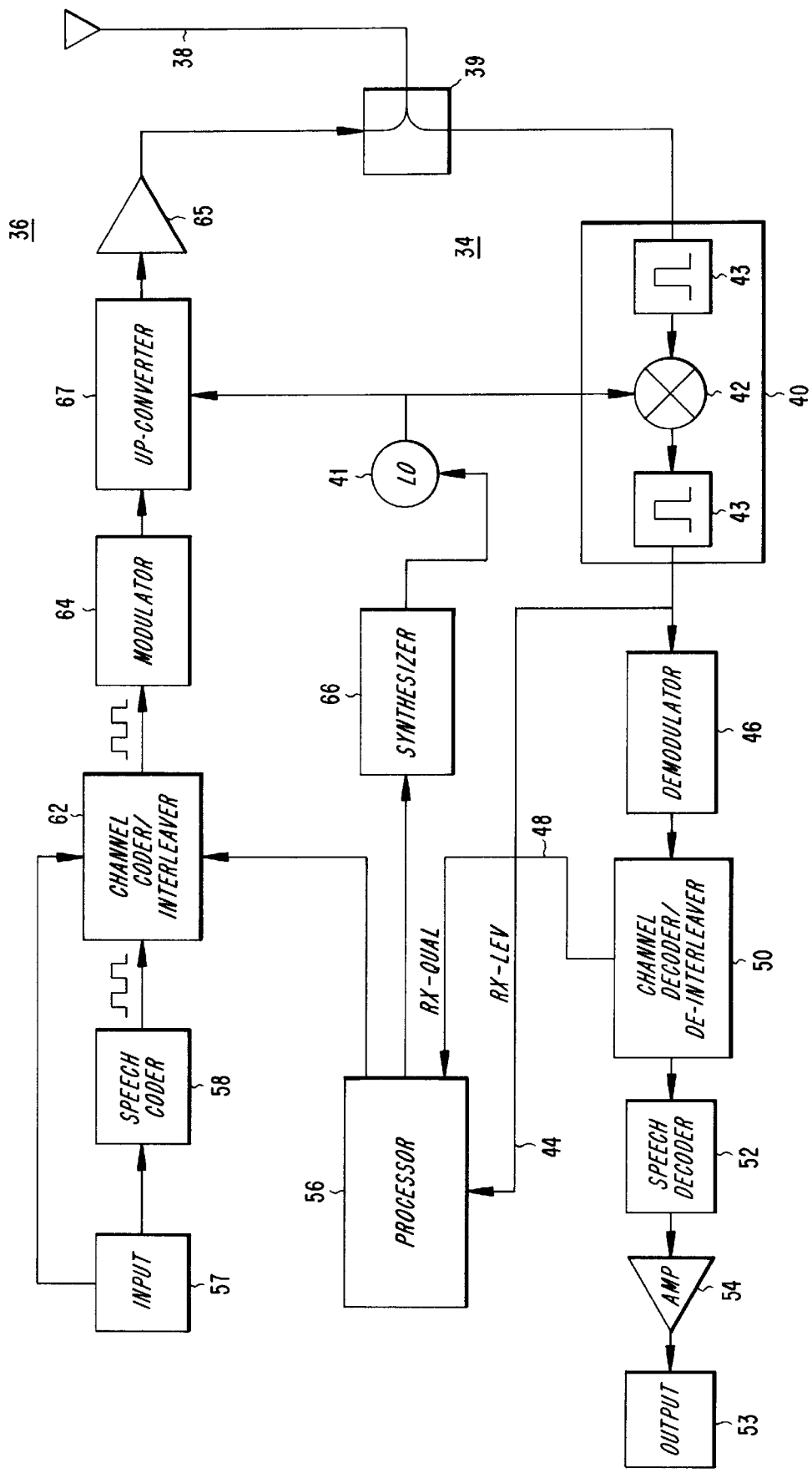
FIG. 4 is a block diagram of a mobile unit used in the communication system of FIG. 1.

With reference to FIG. 4, the block diagram of a mobile station 12 is shown. The mobile station 12 includes a receiver section 34 and a transmitter section 36, which are coupled to an antenna 38 through a duplexer 39. The antenna 38 is used for receiving and transmitting RF signals to and from the BTS 20 over allocated uplink and downlink RF channels. The receiver section 34 includes an RF receiver 40, which includes a local oscillator 41, a mixer 42, and selectivity filters 43 arranged in a well known manner, for down-converting and demodulating received signals to a baseband level. The RF receiver 40, which is tuned by the local oscillator 41 to the downlink channel, also provides an RX-LEV signal on line 44 that corresponds to the received signal strength at the mobile station 12.

The RF receiver provides a baseband signal to a demodulator 46 that demodulates coded data bits representing the received speech, data and signaling information. Depending on the type of mobile station 12, the demodulator 46 can support one or more demodulation schemes corresponding to LLM1, LLM2, and HLM schemes. For example, the demodulator of a mobile station 12 subscribed to an operator that supports LLM1 scheme may be capable of demodulating LLM1 modulated signals only. On the other hand, the demodulator of a mobile station 12 subscribed to an operator that supports all of the three modulation schemes is preferably capable of demodulating LLM1, LLM2, and HLM schemes.

As described above, the demodulator 46 includes an equalizer (not shown) that processes the coded bit pattern disposed on the training sequences, to provide correlator response that are used for predictive demodulation of the baseband signal. The equalizer uses the correlator responses to determine the most probable bit sequence for demodulation. As defined by the GSM specification, a channel decoder/de-interleaver 50 also provides an RX-QUAL signal on line 48, which is a measure of various levels of bit error rate at the mobile station 12. The mobile station 12 reports the RX-QUAL signal and the RX-LEV signal to the BSC 16 on a SACCH channel.

The channel decoder/de-interleaver 50 decodes and de-interleaves the demodulated signal. The channel decoder/de-interleaver 50 may use a wide variety of channel decoding schemes, including CS1–CS4 decoding schemes. The speech data bits are applied to a speech decoder 52 that decodes the speech pattern using one of a variety of supported speech decoding schemes. After decoding, the speech decoder 52 applies an analog speech signal to a output device 53, e.g., a speaker, via an audio amplifier 54. The channel decoder 50 provides the decoded data and signalling information to a microprocessor 56 for further processing, for example, displaying the data to a user.

The transmitter section 36 includes an input device 57, e.g., a microphone and/or keypad, for inputting voice or data information. According to a specified speech/data coding techniques, a speech coder 58 digitizes and codes the voice signals according to a variety of supported speech coding schemes. A channel coder/interleaver 62 codes the uplink data according to a specified coding/interleaving algorithms, including CS1–CS4 coding schemes. The channel coder/interleaver 62 provides an uplink baseband signal to a modulator 64. The modulator 64 modulates the uplink baseband signal according to one or more of supported modulation schemes. Similar to the demodulator 46, the modulator 64 of the mobile station 12 may support one or more of LLM1, LLM2, and HLM schemes.

The modulator 64 applies the coded signal to an up-converter 67, which receives a carrier signal from the up-converted signal local oscillator 41. An RF amplifier 65 amplifies the up-converted signal for transmission trough the antenna 38. A well known frequency synthesizer 66, under the control of the microprocessor 56, supplies the operating frequency information to the local oscillator 41. The microprocessor 56 causes the mobile station 12 to transmit the RX-QUAL and RX-LEV parameters to the RBS 22 over the SACCH.

Figure 5:
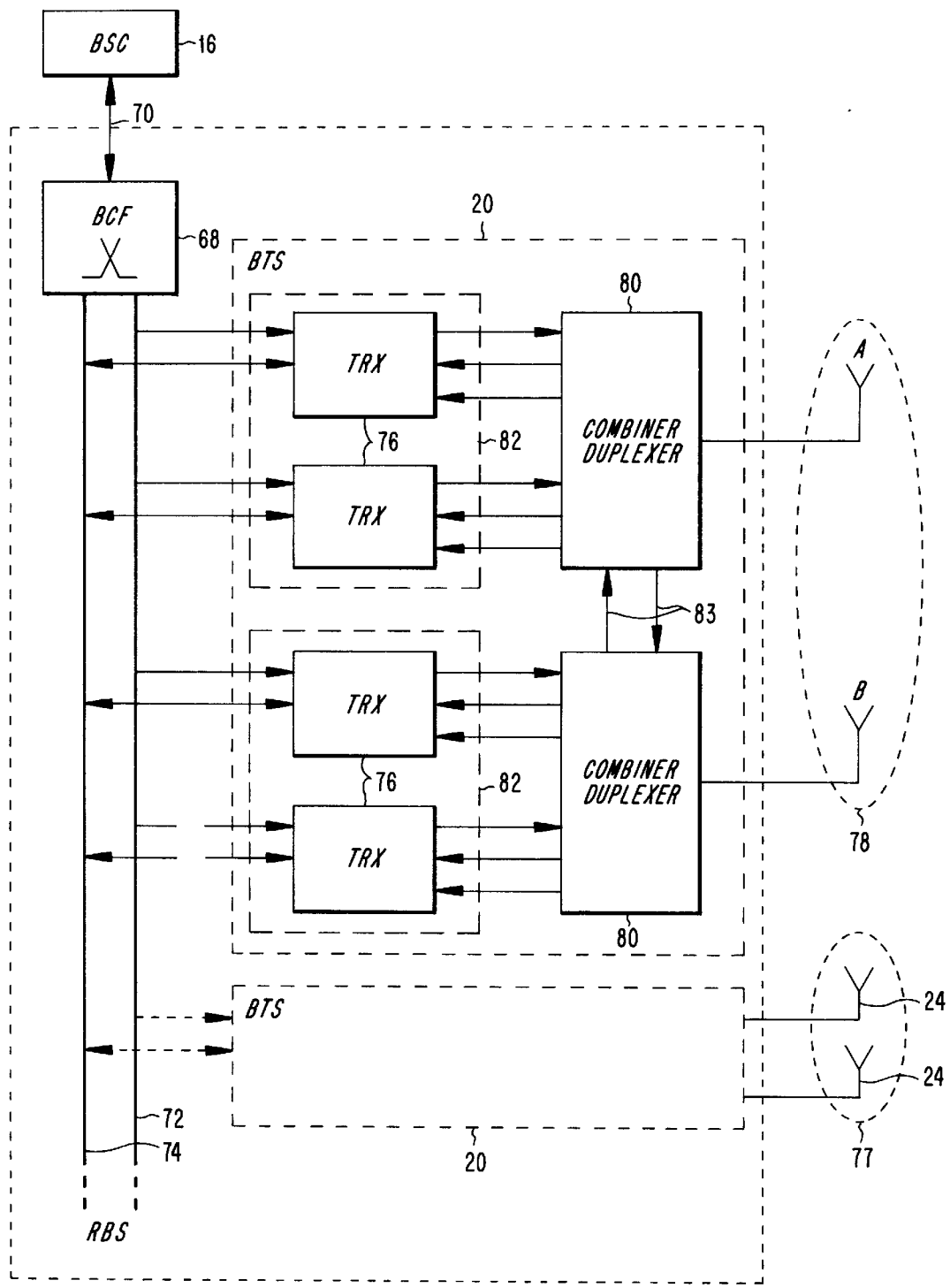
FIG. 5 is a block diagram of a radio base station used in the communication system of FIG. 1.

Referring to FIG. 5, an exemplary block diagram of the RDS 22 is shown to include a plurality of BTSs 20 that serve different geographical areas. Through a timing bus 72, the BTSs 20 are synchronized with each other. Voice and data information are provided to and from the RBS 22 through a traffic bus 74 that may be coupled, through the A-bis interface, to a public or private voice and data transmission line, such as a T1 line (not shown). Each BTS 20 includes TRXs 75 and 76 that communicate with the mobile station 12. As shown, two antennas designated as 24A and 24B are spaced accordingly to cover cells 77 and 78. The TRXs 76 are coupled to the antennas 24 through combiner/duplexers 80 that combine downlink transmission signals from the TRXs 76 and distribute the uplink received signals from the mobile station 12. The RBS 22 also includes a base station common function (BCF) block 68 that controls the operation and maintenance of the RBS 22.

Figure 6:
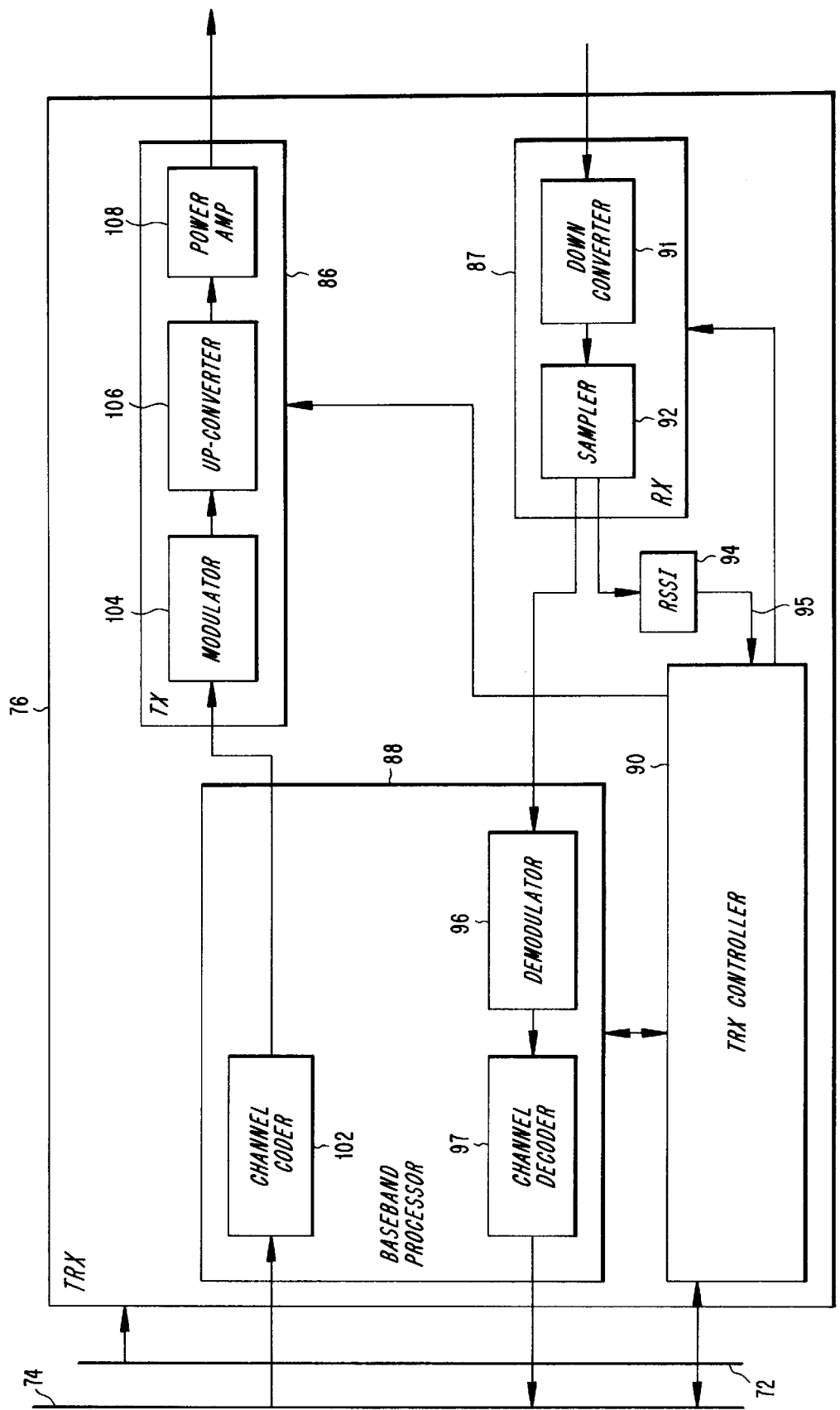
FIG. 6 is a block diagram of a radio transceiver used in the base station of FIG. 5.

Referring to FIG. 6, a block diagram of a TRX 76 is shown. The TRX 76 includes a transmitter section 86, a receiver section 87, a baseband processor 88 and a TRX controller 90. Through a corresponding antenna 24 (shown in FIG. 6), the receiver section 87 receives uplink signals from the mobile station 12. A down-conversion block 91 down-converts the received signal. After down-converting the received signals, the receiver section 87 samples its phase and magnitude, via a sampler block 92, to provide received bit sequence to the baseband processor 88. An RSSI estimator 94 provides an RSSI signal on line 95, which is a measure of the received signal strength. The RSSI estimator 94 may also measure noise disturbance levels during idle channels. The TRX controller 90, which is coupled to the traffic bus 74, processes the commands received from the BSC 16 and transmits TRX related information, such as various TRX measurements, to the BSC 16. Under this arrangement, the TRX 76 periodically reports the RSSI signal and noise disturbance levels to the BSC 16.

The baseband processor 88 includes a demodulator 96 that receives uplink baseband data from the receiver section 87. The demodulator 96 generates correlator responses that are processed in a well known manner to retrieve the uplink baseband data. The demodulator 96 may support demodulation of signals that are modulated using one or more of LLM 1, LLM 2 or HLM schemes. The uplink baseband data is applied to a channel decoder 97 that decodes the baseband signal according to one or more supported channel decoding scheme, including CS1–CS4 decoding schemes. The channel decoder 97 places the decoded baseband signal on the traffic bus 78, for further processing by the BSC 16.

When transmitting downlink baseband data, the baseband processor 88 receives properly coded data or digitized speech information from the BSC 16 over the traffic bus 74 and applies them to a channel coder 102 that codes and inter-leaves speech and data according to one or more of supported channel coding schemes, including CS 1–CS 4 channel coding schemes. The transmitter section includes a modulator 104 that modulates the supplied data bits according to one or more of LLM1, LLM 2, and HLM schemes. The modulator 104 provides downlink baseband signals to an up-conversion block 106 for up-conversion. A power amplifier 108 amplifies the up-converted signal for transmission through a corresponding antenna.

The system 10, for example, uses one or a combination of the RX-QUAL, RX-LEV, or time dispersion parameters, which are measures of link quality parameters of an RF link, to select an optimum combination of modulation and channel coding on an RF link. The system 10 also uses these parameters to decide whether a link adaptation procedure should be initiated or not. The BSC 16 compares the channel characteristic parameter to corresponding thresholds to initiate an link adaptation procedure within coverage areas that support LLM 1, LLM 2, and HLM schemes.

Figure 7:
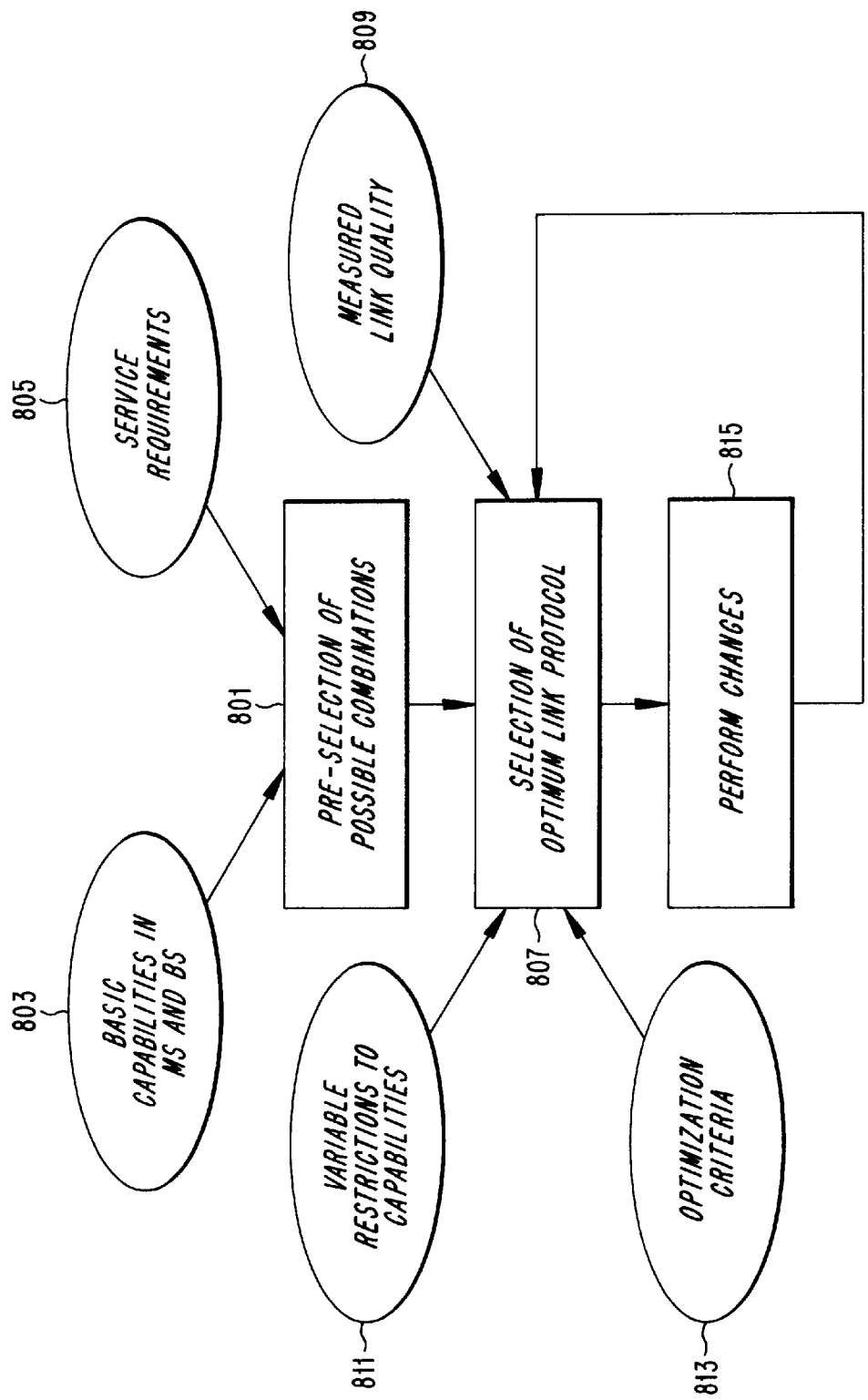
FIG. 7 is a flow chart of a link selection method according to an exemplary embodiment of the invention.

Referring to FIG. 7, a flow chart of a link protocol selection method according to the present invention is shown. The method provides a transparent service with a pre-defined service requirement in terms of user bit rate and service quality over an RF link. The selection method of the invention starts by pre-selecting a set of pre-selected combinations from all possible combinations of channel coding scheme, modulation scheme, and required number of time slots, block 801. TABLE 1, shows an example of different combinations for two channel coding schemes, CS 1 and CS 4, and two modulation schemes, HLM and LLM 2. For each combination TABLE 1 shows the achievable user bit rate, $R_{bu}$, in kbps and the number of required time slots to achieve the $R_{bu}$. It would be appreciated that TABLE 1 could be extended to include a much wider range of combinations of modulation and channel coding schemes and user bit rate $R_{bu}$ over required time slots than that shown by exemplary combinations below.

TABLE 1

| 1 Row Number | 2 $R_{bu}$ [kbps] | 3 Channel coding | 4 Modulation | 5 # OF time slots |
|---|---|---|---|---|
| 1 | 54 | CS1 | LLM2 | 1 |
| 2 | 72 | CS4 | LLM2 | 1 |
| 3 | 80 | CS1 | HLM | 1 |
| 4 | 120 | CS4 | HLM | 1 |

TABLE 1-continued

| 1 Row Number | 2 $R_{bu}$ [kbps] | 3 Channel coding | 4 Modulation | 5 # OF time slots |
|---|---|---|---|---|
| 5 | 108 | CS1 | LLM2 | 2 |
| 6 | 144 | CS4 | LLM2 | 2 |
| 7 | 160 | CS1 | HLM | 2 |
| 8 | 240 | CS4 | HLM | 2 |
| 9 | 162 | CS1 | LLM2 | 3 |
| 10 | 216 | CS4 | LLM2 | 3 |
| 11 | 240 | CS1 | HLM | 3 |
| 12 | 360 | CS4 | HLM | 3 |

In order to determine the pre-selected set of combinations for each connection, the method of the invention takes into account the basic capabilities of the mobile stations 12 and the BTSs 20, block 803. For example, the possible combinations that mobile stations 12 and the BTSs 20 can support may be restricted by their hardware or software capabilities. The basic capabilities include the supported combinations of channel coding and modulation schemes and number of time slots that can be used by the mobile stations 12 and/or BTSs 20. The mobile stations 12 or BTSs 20 may for instance be able to only support a limited subset of modulation and/or channel coding schemes. In addition, the mobile stations 12 may have a limit on the maximum number of time slots they can use to receive or transmit data.

The pre-selection process also takes into account the service requirement, block 805. The predefined service requirements can for example be:

a requirement for a constant user bit rate and a minimum service quality.

a requirement for semi-constant bit rate (constant over a period in time) and a minimum service quality.

a requirement for highest user bit rate with a guaranteed minimum bit rate and service quality.

separate requirements on RF links, for example, a multimedia service may have two or more different requirement for audio transmission and video transmissions.

In order to describe an exemplary pre-selection process, it is assumed that a transparent service requires a constant user bit rate of 144 kbps. The second column of TABLE 1 shows the maximum user bit rate, $R_{bu}$, for all of the specified combinations of modulation and channel coding schemes. As shown, the combinations of rows 1–5 do not meet the minimum requirement for the user bit rate of 144 kbps and are therefore discarded during the pre-selection process.

The third column of TABLE 1 shows the channel coding schemes. If two or more combinations fulfill the user bit rate requirement using the same modulation scheme and the same number of time slots, the system 10 preferably selects the combination(s) that use the lowest channel coding rate. This is because a higher channel coding rate requires a more robust link, which requires higher transmission power to provide a higher user bit rate than is necessary. For example, the combination of row 8 provides an unnecessarily high user bit rate of 240 kbps over two slots using a combination of CS4 coding and HLM modulation schemes. Therefore, system 10 also discards the combination of row 8 during the pre-selection process.

The fifth column of TABLE 1 shows the number of required time slots for providing the user bit rate for a corresponding combination of modulation and channel coding schemes. If the combinations of modulation and channel coding schemes provide sufficiently high user bit rate using a specified number of time slots, the system 10 selects a combination using the least number of time slots to reduce the number of allocated communication resources. The above described criterion for discarding combinations during the pre-selection process depends on the user bit rate requirement of the transparent service.

As described above, the basic capabilities of the mobile stations 12 and BTSs 20 can also restrict the pre-selection of possible combinations. For example, assuming that a mobile station 12, due to hardware or software limitations, can not transmit or receive on more than two time slots. This limitation further decreases the number of possible combinations in the pre-selection process. In TABLE 1, the modulation and channel coding schemes of combination in rows 9–12 require three time slot to support the specified user bit rate. These combinations are discarded, since the mobile station 12 can only support two time slots. Therefore, based on the above described pre-selection process, the set of pre-selected combinations includes the combinations of rows 6 and 7 of TABLE 1.

The following exemplary criterion may be used for discarding the possible combinations of modulation and channel coding schemes and the number of time slots in the pre-selection process. It should be noted that the order of applying the pre-selection criterion described below is not important for determining the set of pre-selection combinations. These criterion include:

Discarding the combinations that can not fulfill the requirements of the user bit rate out of all possible combinations.

Discarding the combinations with the same modulation and used number of time slots but a higher channel coding rate.

Discarding the combinations with the same modulation and coding scheme that use a higher number of time slots.

Discarding the combinations that can not be supported based on the basic capabilities of the mobile stations 12 and/or the BTSs 20.

Once the set of pre-selected combinations is selected, the method of the invention selects an optimum link protocol, block 807. In order to select the optimum link protocol, the system 10 takes into account measurements of one or a combinations of link quality parameters, block 809. These measurements may include C/I ratio on all available RF links, received signal strength, and interference on all available RF links. Moreover, the system 10 also takes into account variable restrictions caused by instantaneous conditions on the capabilities of the mobile stations 12 and/or the BTSs 20, block 811. For example, a mobile station 12 can have a total transmit power limitation defined by $$\sum_i P_i < P_{tot,max}.$$

If the mobile station 12 is transmitting on several time slots, the mobile station's total transmit power over the time slots may exceed a specified limit. Exceeding the limit may cause the mobile stations 12 to transmit at a lower transmit power than necessary to achieve the desired service quality. Additionally, because of restraints on system capacity at any given time, the system 10 may reduce the number of time slots that can be allocated to the mobile stations 12 or BTSs 20. The selection method of the present invention, therefore, takes into account the instantaneous variable restrictions of the system. These restrictions may impose limitations on communication capabilities of the mobile stations 12 and the BTSs 20, when selecting an optimum link protocol for an RF link.

Finally, the system 10 optimizes the selected link protocol according to a pre-defined optimization criteria, block 813. The optimization criteria may be based on a minimized transmit power at the mobile stations 12 and/or BTSs 20, or a minimized communication resource requirement, for example, a minimized number of allocated time slots. In this way, an optimum link protocol is selected such that the number of time slots used for providing the transparent service and/or transmit power at the mobile stations 12 and/or BTSs 20 are minimized. It should be noted, however, that the method of the invention may also be used in systems that only support single time slot reception and transmission and those that do not provide power control capabilities in the mobile stations 20 and BTSs 20.

In one exemplary operation, the system 10 measures link quality parameters of an RF link. Among other things, the link quality parameters may for instance be the C/I ratio determined in a receiver, BER or FER experienced when the RF link was previously used. Then, for all possible combinations of modulation and channel coding schemes, the system 10 estimates a measure of service quality, for example, BER or FER percentages. The system 10 estimates the service quality based on measured link quality parameters. One preferred method for estimating the service quality is disclosed in a concurrently filed patent application titled "A METHOD FOR SELECTING A COMBINATION OF MODULATION AND CHANNEL CODING SCHEMES IN A DIGITAL COMMUNICATION SYSTEM," which is hereby incorporated by reference.

Based on the estimates of the service quality, the system 10 selects an optimum link protocol to realize the service requirement by using the instantaneous variable restrictions and the optimization criteria, for example, system capacity or maximum total power at the mobile stations 12. As described above, two exemplary optimization criterion include minimized transmit power at the mobile stations 12 and/or BTSs 20 or a minimized communication resource requirement, for example, the minimized number of required time slots. Assuming that minimizing the number of required is the primary optimization criteria, the system 10 selects those link protocols that fulfill the service requirement using fewest number of time slots. If more than one combination with the same number of time slots fulfill the service requirement, the system 10 selects a time slot with the least total transmit power or transmit power per time slot. If more than one link protocol with the same number of channels and the same transmit power fulfill the service requirement, then the system 10 selects a link protocol that provides the best service quality.

Assuming that minimizing transmit power in the mobile stations 12 or BTSs 20 is the primary optimization criteria, the system 10 selects link protocols that fulfill the service requirement using the lowest transmit power at the mobile stations 12 and/or BTSs 20. The lowest transmit power may be in terms of total transmit power time slots or transmit power per time slot. If more than one link protocol can use the same transmit power to fulfill the service requirement, then system 10 selects a link protocol that uses the fewest number of time slots. If more than one link protocols with the same transmit power and the same number of time slots fulfill the service requirement, the system 10 selects a link protocol that provides the best service quality.

In an exemplary operation, it is assumed that a mobile station 12 can transmit or receive on three time slots. As a result, the above described pre-selection process produces three possible pre-selection combinations, which are shown in TABLE 2.

TABLE 2

| $R_{bu}$ [kbps] | Channel Coding | Modulation | # of time slots |
|---|---|---|---|
| 144 | CS4 | LLM2 | 2 |
| 160 | CS1 | HLM | 2 |
| 162 | CS1 | LLM2 | 3 |

Assuming that the optimization criteria minimizes the number of required time slots, the system 10 selects a combination using CS1/HLM schemes, which use maximum transmit power. Based on this selection, the system 10 monitors at least one link quality parameter, e.g. C/I ratio, to estimate the service quality, for instance in DER percentage. TABLE 3 represent transmit powers needed to meet the service quality requirement in a robust RF link and a poor RF link.

TABLE 3

| 1 Combination | 2 Power/time slot, robust RF link | 3 Power/time slot, poor RF link |
|---|---|---|
| CS4/LLM2 | 1.00 | 2.00 |
| CS1/HLM | 0.50 | 3.00 |
| CS1/LLM2 | 0.40 | 1.00 |

For example, values in column 2 correspond to transmit power values that meet the DER percentage estimate of the service quality in a robust RF link. Column 3 shows transmit power values needed to meet service quality in a poor RF link. Assuming that the optimization criteria minimizes the number of used time slots, the system 10 selects a CS1/LLM 2 combination (row 3) since it requires medium power on two time slots to satisfy the service quality. If instead the optimization criteria minimizes the transmit power, the system 10 selects the CS1/LLM combination (row 3), which requires three time slots but uses the lowest transmit power, i.e., 0.4. If, however, a variable restriction on system capacity prevents the use of three time slots, the system 10 then selects the CS1/HLM combination of row 2, which requires only two time slots.

Assuming that the maximum transmit power of a mobile station 12 is 2.0 and the CS1/HLM combination can not be selected because of poor link quality, even though maximum transmit power is used, the system 10 selects the CS1/LLM combination (row 3), which uses three time slots, at the maximum transmit power. If minimizing the communication resources is the optimization criteria, then system 10 selects CS4/LLM combination (row 1), which uses two time slots.

Finally, the system 10 performs a link adaptation procedure to use the selected optimum link protocol, block 815. The selected combination of channel coding, modulation scheme and time slot allocation is then signalled to establish the changes in the receivers. From the foregoing it would be appreciated that the present invention significantly facilitates link protocol selection process in systems that supports multiple modulation and coding schemes. In this way, the present invention improves communication quality of systems that support multiple combinations of modulation and coding schemes.

Although the invention has been described in detail with reference only to a preferred embodiment, those skilled in the art will appreciate that various modifications can be made without departing from the invention. Accordingly, the invention is defined only by the following claims which are intended to embrace all equivalents thereof.

What is claimed is:

1. In a communication system including at least one base station and at least one mobile station, a method for selecting a link protocol for a transparent data service having a predefined service requirement comprising the steps of:

pre-selecting from all possible combinations of available link protocols a set of pre-selected combinations of link protocols based on the predefined service requirement and at least one basic capability of the mobile or base stations; and selecting a link protocol from the pre-selected combinations of link protocols based on measurements of one or more link quality parameters and at least one variable restriction caused by instantaneous conditions in the communication system.

2. The method of claim 1 further including the step of optimizing the link protocol according to a predefined optimization criteria.

3. The method of claim 2, wherein the optimization criteria minimizes total transmit power at the mobile or base stations.

4. The method of claim 2, wherein the optimization criteria minimizes the maximum transmit power per time slot.

5. The method of claim 2, wherein the optimization criteria minimizes the number of time slots used to achieve the pre-defined service requirement.

6. The method of claim 1, wherein the predefined service requirement include a requirement to provide a constant user bit rate with a predefined service quality.

7. The method of claim 6, wherein the predefined service quality corresponds to a BER or a FER service quality.

8. The method of claim 1, wherein the set of pre-selected combinations is pre-selected based on a combination of modulation and channel coding schemes, and a required number of time slots.

9. The method of claim 1, wherein the at least one basic capability is selected from one or more of communication capability over a number of time slots, a supported modulated scheme, or a supported channel coding scheme.

10. The method of claim 1, wherein the at least one link quality parameter is selected from one of a C/I ratio, BER, FER, or received signal strength.

11. The method of claim 1, wherein the at least one variable restriction caused by instantaneous conditions in the communication system includes system's instantaneous capacity to allocate time slots.

12. The method of claim 1, wherein the at least one variable restriction caused by instantaneous conditions in the communication system includes instantaneous transmit power at the mobile or base stations.

13. A method for selecting a link protocol for providing transparent data service between a mobile station and a base station comprising the steps of:

measuring at least one link quality parameter of an RF link;

estimating service quality values for all possible combinations of link protocols based on the at least one measured link quality parameter;

pre-selecting a set of pre-selected combinations of link protocols based on estimated service quality values; and selecting a link protocol from the set of pre-selected combinations of link protocols based on an optimization criteria, wherein the step of selecting a link protocol is based on at least one variable restriction caused by instantaneous conditions in the communication system.

14. The method of claim 13, wherein the set of pre-selected combinations of link protocols is selected based on at least one basic capability of the mobile or base stations.

15. The method of claim 13, wherein the at least one variable restriction caused by instantaneous conditions in the communication system includes system's instantaneous capacity to allocate time slots.

16. The method of claim 13, wherein the at least one variable restriction caused by instantaneous conditions in the communication system includes instantaneous transmit power at the mobile or base station.

17. The method of claim 13, wherein the step of selecting a link protocol includes the step of selecting a sub-set of the set of pre-selected combinations of link protocols that uses the minimum number of time slots.

18. The method of claim 13, wherein the step of selecting a link protocol includes the step of selecting a sub-set of the set of pre-selected combinations of link protocols that minimizes total transmit power.

19. The method of claim 13, the step of selecting a link protocol includes the step of selecting a sub-set of the set of pre-selected combinations of link protocols minimizes the maximum transmit power per time slot.

20. The method of claim 13, wherein the set of pre-selected combinations is pre-selected based on a combination of modulation and channel coding schemes, and required number of time slots.

21. The method of claim 14, wherein the at least one basic capability is selected from one or more of communication capability over a number of time slots, a supported modulated scheme, or a supported channel coding scheme.

22. The method of claim 13, wherein the at least one link quality parameter is selected from one of a C/I ratio, BER, FER, or received signal strength.

* * * * *